United States Patent [19]
Batky

[11] Patent Number: 4,635,420
[45] Date of Patent: Jan. 13, 1987

[54] MOTOR VEHICLE GLAZING ASSEMBLY AND METHOD OF MANUFACTURE THEREOF

[75] Inventor: Michael Batky, Brooklyn, N.Y.

[73] Assignee: Almac Plastics Inc., Long Island City, N.Y.

[21] Appl. No.: 726,079

[22] Filed: Apr. 22, 1985

[51] Int. Cl.[4] .......................... B29C 65/08; B60J 1/00
[52] U.S. Cl. ..................................... 52/309.1; 52/403;
    52/208; 52/308; 156/73.1; 156/108;
    156/244.11; 49/488; 264/23; 264/177.1;
    296/90; 296/93
[58] Field of Search ...................... 156/73.1, 580.1, 108,
    156/244.11; 264/23, 177 R; 296/84 R, 84 A, 90,
    93; 49/488; 52/308, 309.1, 208, 403, 717.1, 397

[56]                References Cited
              U.S. PATENT DOCUMENTS

| 1,545,694 | 7/1925  | Potter .        |         |
|-----------|---------|-----------------|---------|
| 2,388,297 | 11/1945 | Slaughter       | 52/282  |
| 3,224,916 | 12/1965 | Soloff et al.   | 156/73  |
| 3,230,677 | 1/1966  | Brown           | 296/93  |
| 3,284,257 | 11/1966 | Soloff et al.   | 156/73  |
| 3,531,896 | 10/1970 | Dean            | 49/488  |
| 3,574,024 | 4/1971  | Rose            | 156/108 |
| 3,756,881 | 9/1973  | Denman          | 156/108 |
| 3,879,241 | 4/1975  | Butler          | 156/108 |
| 3,975,474 | 8/1976  | Leblanc         | 264/23  |
| 4,259,419 | 3/1981  | Uba et al.      | 429/174 |
| 4,405,175 | 9/1983  | Hoffmann        | 296/93  |
| 4,475,966 | 10/1984 | Turner et al.   | 156/73.1|

FOREIGN PATENT DOCUMENTS 312844  6/1929  United Kingdom .................. 296/93

OTHER PUBLICATIONS

Branson Sonic Power Company, "Ultrasonic Assembly", Mar. 1981.
Branson Sonic Power Company, Technical Information Bulletin PW-1, "Ultrasonic and Vibration Welding Characteristics and Compatibility of Thermoplastics", Nov. 1982.

Primary Examiner—Michael Wityshyn
Attorney, Agent, or Firm—Jeffrey H. Ingerman

[57]  ABSTRACT

A motor vehicle glazing assembly is provided in which a sheet of thermoplastic glazing material is ultrasonically welded to a gasket which is coextruded from a material capable of being ultrasonically welded to the glazing and a material suitable for mating with a motor vehicle window frame. A method of manufacturing the assembly is also provided, as is a pop-out safety feature for thermoplastic glazing.

17 Claims, 7 Drawing Figures

MOTOR VEHICLE GLAZING ASSEMBLY AND METHOD OF MANUFACTURE THEREOF

BACKGROUND OF THE INVENTION

This invention relates to motor vehicle glazing, and particularly to a motor vehicle glazing assembly having a gasket ultrasonically welded to a sheet of thermoplastic glazing material. This invention also relates to thermoplastic motor vehicle glazing having a breakaway feature.

Motor vehicle glazing, which can be either glass or plastic, particularly stationary glazing such as a windshield or a rear window, is typically installed with a gasket surrounding the glazing material. The gasket performs several functions. First, it keeps the elements from entering into the motor vehicle around the edges of the glazing. Second, it cushions the glazing from the motor vehicle window frame, reducing the chance of breakage. The gasket is typically made from a flexible material, and it therefore also eases the installation of the glazing because it can be deformed to fit into the frame.

Originally, motor vehicle glazing gaskets were mated and bonded to both the glazing material and the frame at the time of installation of the glazing, using adhesives applied at that time. However, application of the gasket to the glazing at the point of installation is a messy and time-consuming operation.

It is known to apply the gasket to the glazing at an earlier stage in the vehicle assembly process using the same type of adhesive. Although this does not eliminate the need to use adhesives, it does shorten the time needed to install the glazing on the vehicle.

It is also known to provide a gasket of thermoplastic material with an electrical resistance heating element embedded in it. The gasket is positioned so that it contacts both the glazing and the frame and may or may not cover the edges of the glazing. An electric current is then passed through the heating element to melt the gasket so that it bonds to both the frame and the glazing. This method avoids the use of adhesive but is a very time-consuming step in the assembly process.

In another known method, a gasket is injection molded directly onto the glazing material without using adhesive. This eliminates the use of adhesive and also eliminates the gasket-applying step during installation. However, motor vehicle glazing comes in all shapes, sizes and contours. An injection molding machine can only be set for one size, shape and contour, so separate machines are required for each different piece of glazing, resulting in great expense and capital investment.

Motor vehicle glazing made of silicate glass is generally made of laminated safety glass which, when shattered, breaks into small rounded pieces. However, thermoplastic glazing does not have such a characteristic.

It would be desirable to economically reduce the use of adhesives in motor vehicle glazing installations. It would also be desirable to minimize the time needed to install motor vehicle glazing. Finally, it would be desirable to impart to thermoplastic motor vehicle glazing a characteristic similar to that of safety glass.

SUMMARY OF THE INVENTION

It is an object of this invention to provide a motor vehicle glazing assembly including a gasket.

It is also an object of this invention to produce such an assembly without the use of adhesives.

It is a further object of this invention to provide thermoplastic motor vehicle glazing having a breakaway characteristic.

In accordance with this invention, there is provided a motor vehicle glazing assembly comprising a sheet of thermoplastic material and a gasket having a flexible glazing mating portion, a flexible vehicle mating portion and an ultrasonic welding capable portion adjacent the glazing mating portion. A method of manufacturing the assembly is also provided. The thermoplastic glazing material is received in the flexible glazing mating portion such that it contacts the ultrasonic welding capable portion and is ultrasonically welded thereto.

In accordance with another aspect of the invention, there is provided a motor vehicle glazing assembly comprising a sheet of thermoplastic glazing material including an optical field having a first predetermined fracture load and a breakaway zone having a second predetermined fracture load less than said first predetermined fracture load.

BRIEF DESCRIPTION OF THE DRAWINGS

The above and other objects and advantages of this invention will be apparent upon consideration of the following detailed description, taken in conjunction with the accompanying drawings, in which like reference characters refer to like parts throughout, and in which.

DETAILED DESCRIPTION OF THE INVENTION

Figure 1:
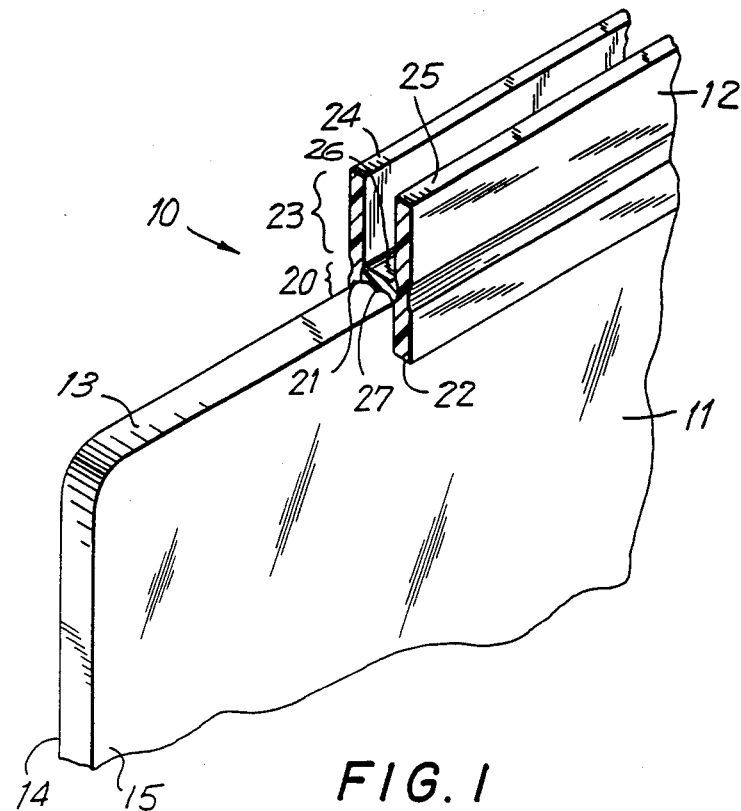
FIG. 1 is a fragmentary perspective view, partly in section, of one embodiment of the motor vehicle glazing assembly of this invention.
Figure 2:
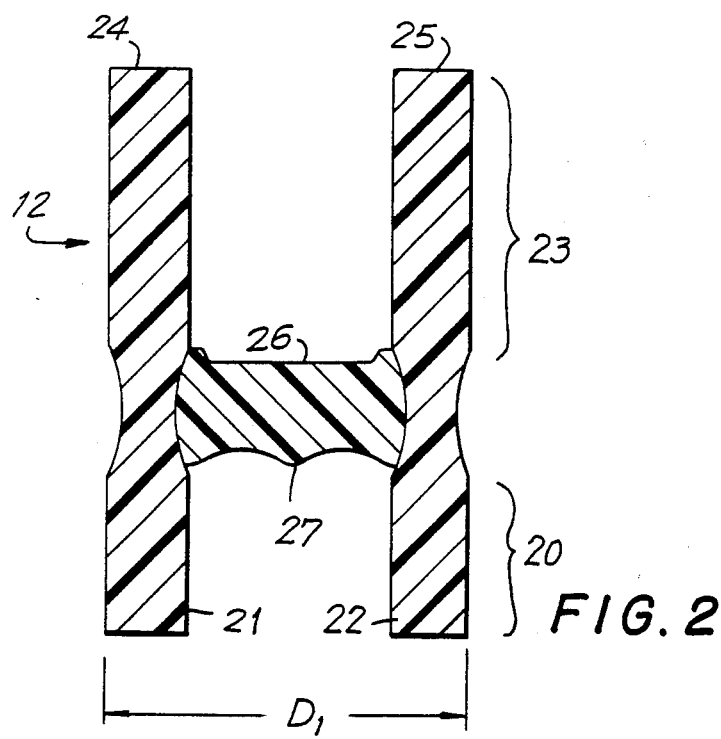
FIG. 2 is a cross-sectional view of the gasket of the embodiment of FIG. 1.

A preferred embodiment of a motor vehicle glazing assembly according to the present invention is shown in FIGS. 1 and 2. Motor vehicle glazing assembly 10 includes a sheet 11 of thermoplastic glazing material and a gasket 12 attached to the edge 13 of sheet 11. Gasket 12 includes a flexible glazing mating portion 20 for mating gasket 12 to sheet 11. Flexible glazing mating portion 20 includes flanges 21, 22. Gasket 12 also includes flexible vehicle mating portion 23, which includes flanges 24, 25 for mating to a motor vehicle.

Finally, gasket 12 includes ultrasonic welding capable portion 26 having ridge 27. Ultrasonic welding capable portion 26 is ultrasonic welding capable by virtue of the choice of materials. Ultrasonic welding capable portion 26 must be made from a material capable of propagating ultrasonic energy. Those materials which are suitable for ultrasonic welding are well known in the ultrasonic welding field, as will be discussed in more detail below.

Flexible glazing mating portion 20 is placed on edge 13 of sheet 11 so that edge 13 contacts ultrasonic welding capable portion 26, and edge 13 and portion 26 are then ultrasonically welded together to hold gasket 12 on sheet 11. The ultrasonic welding can be accomplished by inserting an ultrasonic welding horn (not shown) between flanges 24, 25 so that it contacts ultrasonic welding capable portion 26, in a manner which is well known in the field of ultrasonic welding.

The ultrasonic welding of portion 26 to edge 13 can be enhanced by properly shaping the cross-sectional configuration of portion 26. It is well known in the field of ultrasonic welding that better ultrasonically welded joints result if one of the parts to be welded has an energy-directing cross section. As shown in FIGS. 1 and 2, portion 26 is designed with a cross section which results in a ridge 27 extending along the length of portion 26 and edge 13. It is this ridge 27 into which the ultrasonic energy is directed, and it is ridge 27 which bonds to edge 13. However, other "director" structures can be used in place of ridge 27 and are well known in the field of ultrasonic welding.

The quality of the ultrasonic welding is also determined by the choice of materials for the various parts. Not only must portion 26 be made of a material capable of propagating ultrasonic energy, but that material must also be compatible with the material of sheet 11 from an ultrasonic welding standpoint. Silicate glass cannot be ultrasonically welded, and therefore the present invention is limited to thermoplastic glazing materials. It is well known in the field of ultrasonic welding which materials are compatible with each other. The material used for the flexible glazing and vehicle mating portions 20, 23 need not be compatible with the other materials as far as its ultrasonic propagating characteristics are concerned, but it cannot be so soft a material—e.g., a soft rubber—that it damps out the ultrasonic energy applied to portion 26.

In the preferred embodiment illustrated in FIGS. 1 and 2, flexible glazing and vehicle mating portions 20, 23 are made of polyvinyl chloride (PVC), ultrasonic welding capable portion 26 is made of acrylonitrile-butadiene-styrene (ABS) plastic, and thermoplastic glazing sheet 11 is made of an acrylic plastic. ABS and acrylic plastics are known to be very compatible for ultrasonic welding, and PVC is not soft enough to damp out the ultrasonic energy. Preferably, gasket 12 is formed by coextruding ABS and PVC, with the ABS forming portion 26 and the PVC forming the remainder of gasket 12.

The material used for the flexible portions 20, 23 of gasket 12 is in fact determined by the motor vehicle manufacturer's specifications, because, for example, it must be compatible with the method used to attach glazing assembly 10 to the motor vehicle window frame, and it must weather well. Once glazing assembly 10 is completed, it is installed in a motor vehicle window frame by the traditional methods used in the motor vehicle industry. In fact, the configuartion of flexible vehicle mating portion 23 will differ depending on the manufacturer and even the model of the motor vehicle. It is even possible that it will not be "flexible" in the colloquial sense. However, as used herein and in the claims which follow, "flexible" means that the material conforms to motor vehicle manufacturer specifications.

In addition, although sheet 11 is shown as being flat, the present invention can be employed with equal ease and equally good results on any thermoplastic glazing of any size, shape and contour.

Figure 3:
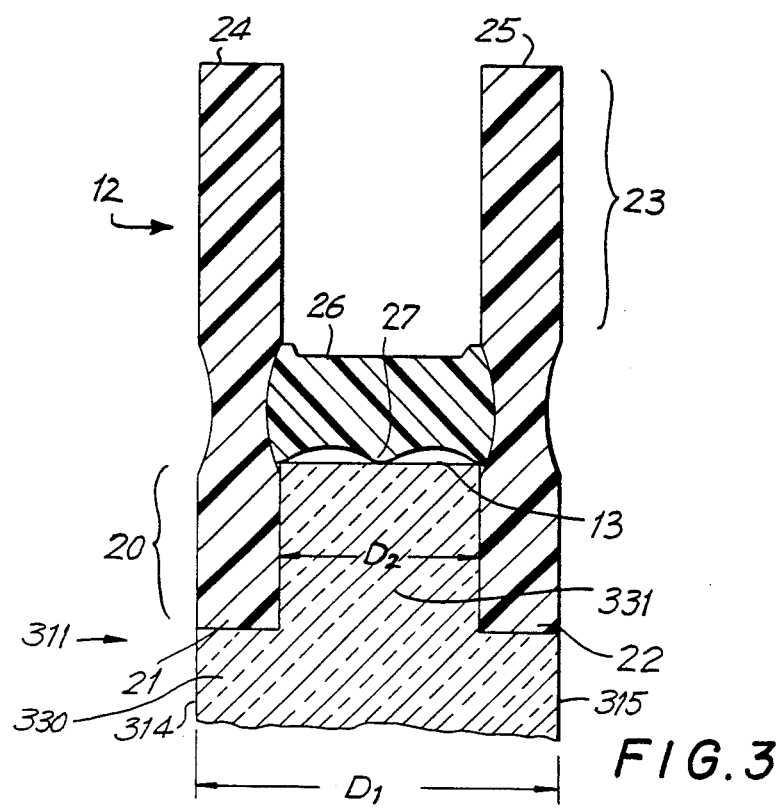
FIG. 3 is a fragmentary cross-sectional view of an alternative embodiment of the motor vehicle glazing assembly of this invention.

In the embodiment shown in FIGS. 1 and 2, flanges 21, 22 of flexible glazing mating portion 20 are raised with respect to surfaces 14, 15 of sheet 11, and are separated from each other by a distance $D_1$. In some applications, it may be desirable for flanges 21, 20 to be flush with the glazing material. Therefore, in the embodiments shown in FIGS. 3 and 4, sheets 311 and 411 of thermoplastic glazing material both have an optical field portion 330 of thickness $D_1$ but are provided with a tongue 331 having a smaller thickness $D_2$, such that flanges 21, 22 are flush with surfaces 314, 315.

Figure 4:
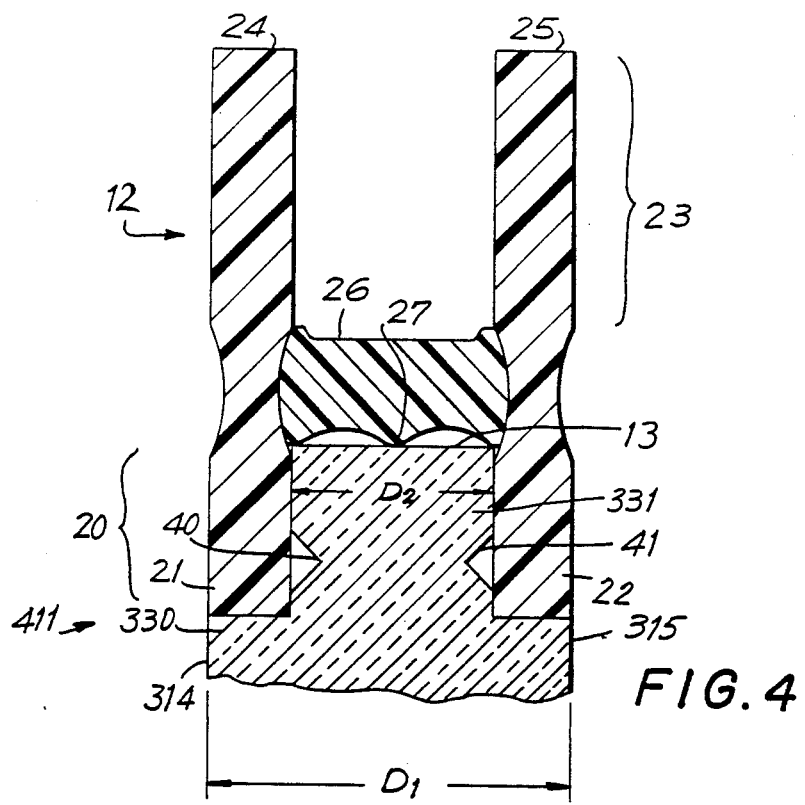
FIG. 4 is a fragmentary cross-sectional view of another alternative embodiment of the motor vehicle glazing assembly of this invention.

In the embodiment shown in FIG. 4, tongue 331 is provided with notches 40, 41 forming a reduced width area of tongue 331. These notches 40, 41 and the resultant reduced width area form a breakaway zone which compensates for the fact, discussed above, that thermoplastic glazing materials do not shatter into small, rounded pieces the way laminated silicate safety glass does. The breakaway zone in FIG. 4 is designed to have a fracture load less than that of optical field portion 330. Therefore, if an object strikes sheet 411, the breakaway zone in tongue 331 will fail, so that optical field portion 330 will break away from gasket 12 rather than shatter. Other configurations of notches 40, 41 are possible, as will be discussed below.

Figure 5:
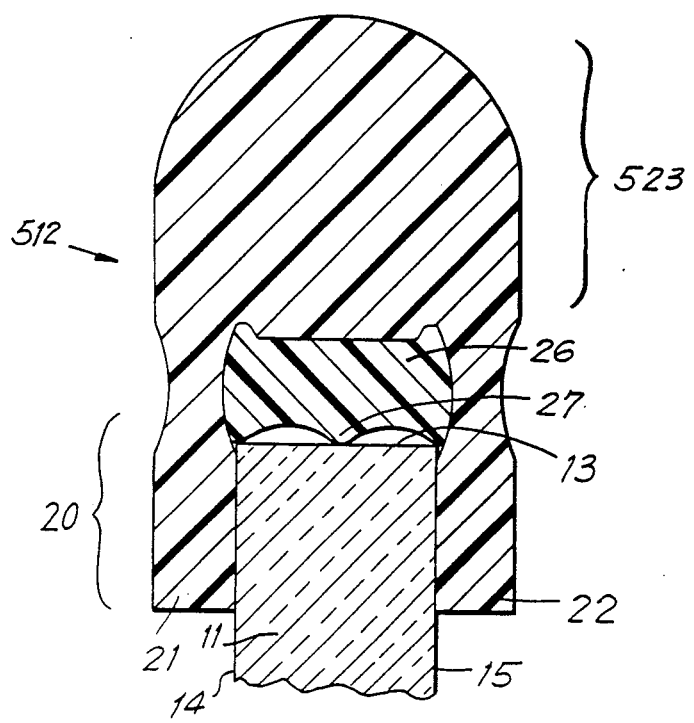
FIG. 5 is a fragmentary cross-sectional view of yet another alternative embodiment of the motor vehicle glazing assembly of this invention.

In the embodiments of FIGS. 1–4, flexible vehicle mating portion 23 of gasket 12 had an area between flanges 24, 25 into which an ultrasonic welding horn could be inserted for contact with ultrasonic welding capable portion 26. However, in some instances, a motor vehicle manufacturer may employ a gasket such as that shown in FIG. 5 at 512. In such a case, in which flexible vehicle mating portion 523 is solid, it would not be possible for an ultrasonic welding horn to contact portion 26. However, as is well known in the field of ultrasonic welding, it is possible to ultrasonically weld two materials by having the horn contact one of the materials at a point remote from the joint. The only difference is that different energy propagation characteristics are necessary, and therefore different materials may have to be used. For example, although ABS and acrylic plastics are suitable for such "far field" ultrasonic welding, they are not as suitable as they are for "near field" ultrasonic welding.

Figure 6:
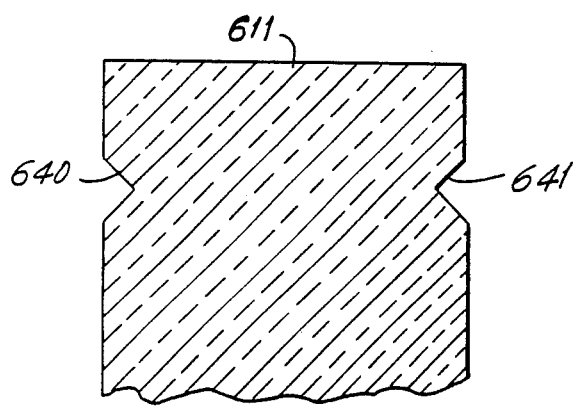
FIG. 6 is a fragmentary cross-sectional view of an embodiment of a sheet of thermoplastic glazing material according to this invention.

Notches 40, 41, shown in FIG. 4 as forming a breakaway zone in tongue 331 of sheet 411, need not be located in a tongue of a sheet of thermoplastic glazing material. In fact, the use of notches such as notches 40, 41 to form a breakaway zone in any sheet of thermoplastic glazing material, whether ultrasonically welded to a gasket or not, is another aspect of the present invention. As shown in FIG. 6, notches 640, 641 can be provided in a sheet 611 of thermoplastic glazing material which does not have a tongue at all. Notches 640, 641 provide a breakaway zone in sheet 611 which will allow it to pop out of whatever type of mounting is used to install it.

Figure 7:
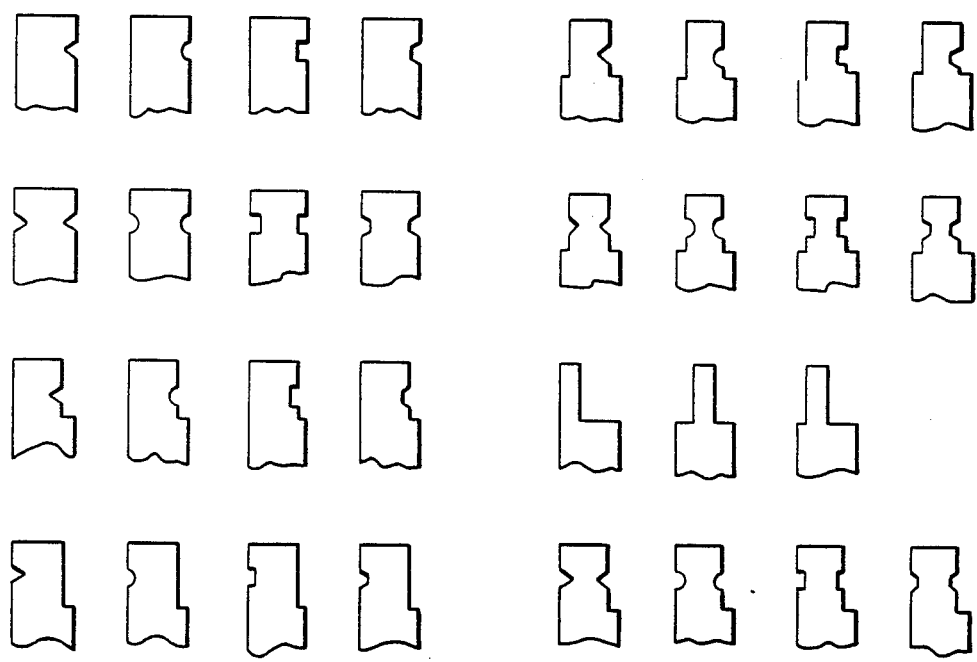
FIG. 7 is a schematic representation of variations of the embodiment of FIG. 6.

The breakaway zone need not even be formed from symmetrical notches 640, 641. FIG. 7 shows just some of an almost infinite number of possible configurations for breakaway zones in thermoplastic glazing materials. In some applications, for example, it may be desirable for the glazing to break away only if struck from one side but not if struck from the other.

Thus, a motor vehicle glazing assembly is provided which can be assembled without using adhesives and which will shorten the time needed to install motor vehicle glazing. It has been shown that thermoplastic glazing material can be imparted with a safety characteristic comparable to that of a laminated silicate safety glass. One skilled in the art will recognize that the inventive principles disclosed herein can be practiced by other than the embodiments shown, which have been presented for the purposes of illustration rather than limitation, and the present invention is limited only by the claims which follow.

What is claimed is:

1. A motor vehicle glazing assembly comprising:
a sheet of thermoplastic glazing material; and
a gasket comprising:
   a flexible glazing mating portion,
   a flexible vehicle mating portion, and
   an ultrasonic welding capable portion adjacent said glazing mating portion; wherein
   said thermoplastic glazing material is received in said flexible glazing mating portion such that it contacts said ultrasonic welding capable portion, said thermoplastic glazing material being ultrasonically welded to said ultrasonic welding capable portion.

2. The motor vehicle glazing assembly of claim 1 wherein said ultrasonic welding compatible portion comprises an energy-directing cross-sectional configuration.

3. The motor vehicle glazing assembly of claim 2 wherein said energy-directing cross-sectional configuration comprises a ridge extending longitudinally along said ultrasonic welding capable portion, said ridge being ultrasonically welded to said sheet of thermoplastic glazing material.

4. The motor vehicle glazing assembly of claim 1 wherein said gasket is a coextrusion of said ultrasonic welding capable portion and said flexible glazing and vehicle mating portions.

5. The motor vehicle glazing assembly of claim 1 wherein said thermoplastic glazing material and said ultrasonic welding capable portion comprise materials selected for ultrasonic welding compatibility, and said flexible glazing and vehicle mating portions comprise a material capable of propagating ultrasonic energy.

6. The motor vehicle glazing assembly of claim 5 wherein said thermoplastic glazing material is an acrylic plastic, said ultrasonic welding capable portion is acrylonitrile-butadiene-styrene plastic, and said flexible glazing and vehicle mating portions are polyvinyl chloride.

7. The motor vehicle glazing assembly of claim 6 wherein said gasket is a coextrusion of said acrylonitrile-butadiene-styrene ultrasonic welding capable portion and said polyvinyl chloride flexible glazing and vehicle mating portions.

8. The motor vehicle glazing assembly of claim 1 wherein said sheet of thermoplastic glazing material comprises an optical field portion and a tongue portion for being received in said flexible glazing mating portion, said optical field portion having a first thickness and said tongue portion having a second thickness less than said first thickness, said flexible glazing mating portion having dimensions such that said flexible glazing mating portion is flush with said optical field portion when said tongue portion is received in said flexible glazing mating portion.

9. The motor vehicle glazing assembly of claim 1 wherein said sheet of thermoplastic glazing material comprises an optical field portion, and a breakaway zone having a fracture load less than the fracture load of said optical field portion.

10. The motor vehicle glazing assembly of claim 9 wherein said optical field portion has a first thickness and said sheet of thermoplastic glazing material further comprises a tongue portion having a second thickness less than said first thickness, said flexible glazing mating portion having dimensions such that said flexible glazing mating portion is flush with said optical field portion when said tongue portion is received in said flexible glazing mating portion, said breakaway zone being in said tongue portion.

11. The motor vehicle glazing assembly of claim 9 wherein said breakaway zone comprises a zone of reduced thickness as compared to the remainder of said sheet of thermoplastic material.

12. A method of manufacturing a motor vehicle glazing assembly, said method comprising the steps of:
   providing a sheet of thermoplastic glazing material;
   forming a gasket comprising a flexible glazing mating portion, a flexible vehicle mating portion, and an ultrasonic welding capable portion adjacent said flexible glazing mating portion;
   receiving said sheet of thermoplastic glazing material in said flexible glazing mating portion such that it contacts said ultrasonic welding capable portion; and
   ultrasonically welding said thermoplastic glazing material to said ultrasonic welding capable portion.

13. The method of claim 12 wherein said forming step comprises forming said ultrasonic welding capable portion with an energy-directing cross-sectional configuration.

14. The method of claim 13 further comprising forming said cross-sectional configuration with a ridge extending longitudinally along said ultrasonic welding capable portion.

15. The method of claim 12 wherein said forming step comprises coextruding said ultrasonic welding capable portion and said flexible glazing and vehicle mating portions.

16. The method of claim 12 further comprising selecting said thermoplastic glazing material and said ultrasonic welding capable portion from materials which are ultrasonic welding compatible, and selecting said flexible glazing and vehicle mating portions from materials capable of propagating ultrasonic energy.

17. The method of claim 12 wherein said providing step comprises providing said sheet of thermoplastic glazing material with an optical field having a first predetermined fracture load and a breakaway zone having a second predetermined fracture load less than said first predetermined fracture load.

* * * * *